(No Model.) 2 Sheets—Sheet 1.
A. W. JOHNSON.
BUTTON HOLE ATTACHMENT FOR SEWING MACHINES.
No. 374,479. Patented Dec. 6, 1887.
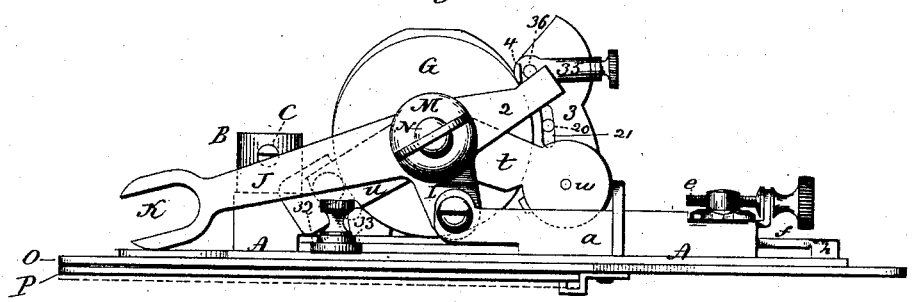
Fig. 1
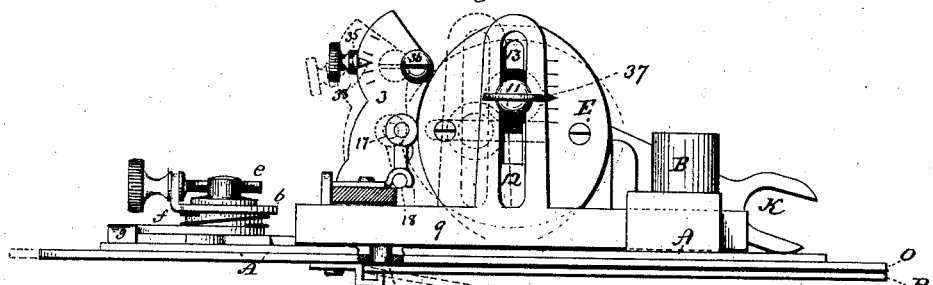
Fig. 2
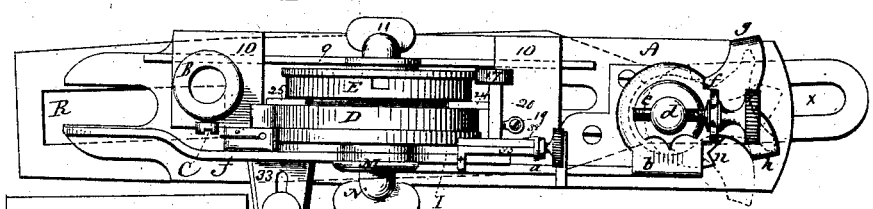
Fig. 3
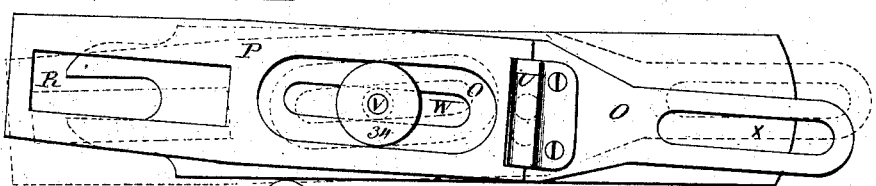
Witnesses
J. N. Shumway
Fred C. Earle
Albert W. Johnson
Inventor
By Atty
Wm. O. Earle (No Model.) 2 Sheets—Sheet 2.

A. W. JOHNSON.
BUTTON HOLE ATTACHMENT FOR SEWING MACHINES.

No. 374,479. Patented Dec. 6, 1887.

Witnesses
J. H. Shumway
Fred O. Earle

Albert W. Johnson
Inventor
By Atty.

UNITED STATES PATENT OFFICE.

ALBERT W. JOHNSON, OF NEW HAVEN, CONNECTICUT, ASSIGNOR TO SAMUEL HALLIWELL, OF SAME PLACE.

BUTTON-HOLE ATTACHMENT FOR SEWING-MACHINES.

SPECIFICATION forming part of Letters Patent No. 374,479, dated December 6, 1887.

Application filed December 13, 1886. Serial No. 221,405. (No model.)

*To all whom it may concern:*

Be it known that I, ALBERT W. JOHNSON, of New Haven, in the county of New Haven and State of Connecticut, have invented a new Improvement in Button-Hole Attachments for Sewing-Machines; and I do hereby declare the following, when taken in connection with accompanying drawings and the letters of reference marked thereon, to be a full, clear, and exact description of the same, and which said drawings constitute part of this specification, and represent, in—

Figure 10:
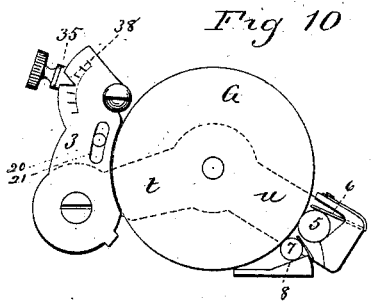
Figure 9:
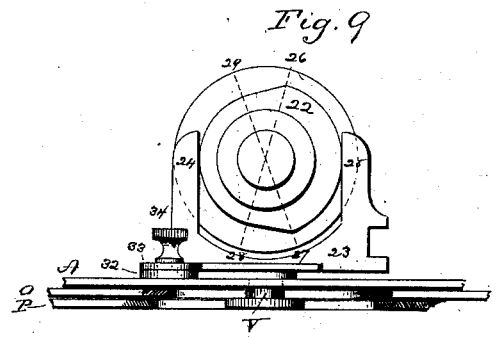
Figure 11:
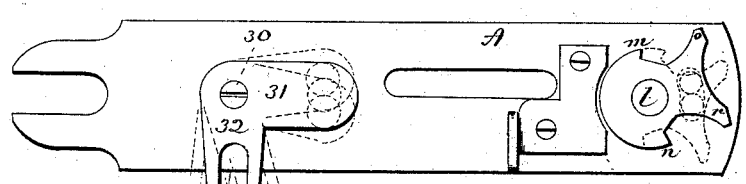
Figure 12:
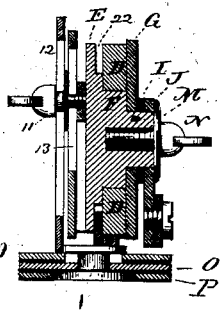
Figure 13:
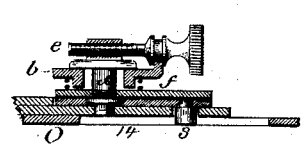
Figure 14:
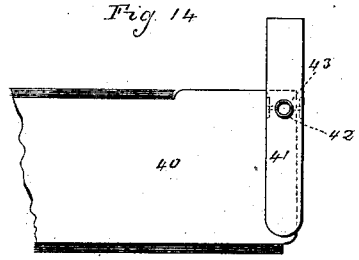
Figure 15:
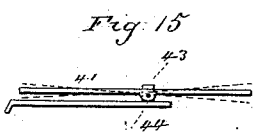
Figure 16:
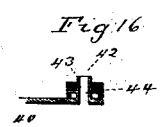

Figure 1, a side view looking from the right; Fig. 2, a side view looking from the left; Fig. 3, a top view of the same in the position of Fig. 1; Fig. 4, an under side view; Fig. 5, a transverse section through the working-slot in the work-holder; Fig. 6, a top view of the forward end portion of the plate P; Fig. 7, an under side view of the forward end of the plate O, Figs. 6 and 7, showing the rib and groove around the slot in the work-holder; Fig. 8, an under side view of the base, the work-holder removed; Fig. 9, a detached view showing the slide 23 and its actuating-cam; Fig. 10, a detached view of the feed-wheel and feed-lever; Fig. 11, a top view of the base, showing the shifter *i* and the bell-crank lever 31 32; Fig. 12, a transverse vertical central section through the crank-disk, feed-disk, &c.; Fig. 13, a longitudinal central section through the dog and shifter; Fig. 14, a top view of the throat-plate, showing the rocker; Fig. 15, a transverse section of the throat-plate, cutting through the needle-hole; Fig. 16, a vertical section of the rocker through the needle-hole.

This invention relates to an improvement in that class of button-hole attachments for sewing-machines which are adapted to be applied to the presser-foot bar of the machine, and which is actuated through a lever hung upon the attachment and extending into connection with the needle-bar, so that the up-and-down reciprocating movement of the needle-bar imparts a vibratory movement to the said lever, and this vibratory movement of the said lever imparts the required movement to the respective parts of the attachment.

A represents the base, upon the upper side of which is a socket, B, adapted for attachment to the presser-foot bar, and to which it may be secured by a screw, C, or otherwise, and so that the attachment may partake of the up-and-down movement of the presser-foot bar. On the base is an upright, D, (see Figs. 3 and 12,) which is in the form of a flat plate the plane of which is longitudinally of the attachment. On one side of this upright is a disk, E, the hub F of which extends through the upright. The disk, however, takes a bearing upon its side of the upright. Upon the opposite side of the upright is a concentric disk, G, made fast to the hub F of the disk E, and so that the disk G forms a bearing against its side of the upright D, but so as to permit the free revolution of the disks E and G. Upon the extension H of the hub F a lever, I, is hung loosely, and so as to vibrate thereon independent of the disks E and G, and outside the lever I is a second lever, J, also loose upon the extension H of the hub F. This lever J is the actuating-lever, and terminates at its free end in a fork, K. (See Fig. 1.) This fork is adapted to engage the needle-bar in the usual manner for this class of sewing-machine attachments, and so that up-and-down reciprocating movement of the needle will impart corresponding vibratory movement to the lever J. From the lever J an arm, L, extends downward, forming what in this class of attachments is commonly called a "bell-crank lever."

Outside the lever J a collar, M, is applied, and through this collar a set screw, N, is introduced, screwed into the hub F H, as seen in Fig. 12, and so as to bind the collar firmly against the hub, but so as to leave the levers I and J free to vibrate independent of the disks E and G.

Beneath the base the work-holding clamp is arranged. This consists of a plate, O, hung upon the under side of the base, and so as to be free for longitudinal and transverse movement, as hereinafter described, and of a second plate, P, hinged to the under side of the plate O at a point distant from the needle end of the two plates, and so as to leave the needle end of the plate P free to swing up and down, as the case may be, and as indicated in broken lines, Fig. 2.

The plates O and P are each constructed with a like opening, R, at the needle end, this opening being somewhat larger than the maximum size of button-hole to be wrought.

Upon the adjacent faces of the two plates O and P, and around the opening R, a rib is formed on the one and corresponding groove on the other.

In the illustration, Figs. 5, 6, and 7, the rib S is formed on the plate P, and the corresponding groove T in the plate O. The material in which the button-hole is to be wrought is introduced between these two plates, and so as to bring the point for the button-hole centrally into the opening R. Then the two plates brought together clamp the work, the rib and groove so engaging the work as to prevent its accidental displacement. The plate P is hinged to the plate O by a socket, U. (See Figs. 2 and 4.) This socket is of U shape, in length somewhat less than the width of the plate P, the depth of the U being greater than the thickness of the plate P. In the hinged end of the plate P a slot is made, in which one leg of the U stands as a support for that end of the plate P, and so as to allow free up-and-down swinging movement to the plate P, and also permits a considerable amount of up-and-down movement at the hinge, so that the plates may open to a considerable extent and still maintain their parallelism, as in broken lines, Fig. 1. It also permits rocking movement to the plate P, to adapt it to varying thicknesses of material surrounding the button-hole. Therefore, by means of the socket, the plate P is permitted a universal self-adjustment to accommodate itself to variations of the material surrounding the point where the button-hole is to be wrought.

The plate O being hung to the base and the base to the presser-foot, when the presser-foot is raised the plate O will rise with it; but the free end of the plate P will remain upon the cloth-plate of the machine, so that as the attachment rises it will open the clamp, as indicated in broken lines, Fig. 2, and thus while the presser-foot is raised permit the introduction or removal of the work. Then when the work is introduced the presser-foot is dropped in the usual manner of clamping work in sewing-machines, and the two plates grasp the work between them under the pressure of the presser-foot spring, and so that the two plates, moving together, will properly present the work to the needle.

The movement of the work-holder or plates O P is substantially the same as in other work-holders in sewing-machine attachments—that is to say, they receive a lateral vibratory movement to permit the needle to first descend through the work upon the inner edge of the button-hole, and then in the next stitch to take onto the material outside the button-hole, and so continuing. They also receive an advance movement or feed for each stitch until the end of the button-hole is reached. Then the holder is thrown to the opposite side, and returned by the step-by-step feed to stitch the opposite side of the button-hole.

The plate O is constructed with a longitudinal slot, W, which works upon a stud, V, projecting downwardly through the base A, and so that it may vibrate thereon in a horizontal plane, and at the same time may move longitudinally back and forth.

The vibratory or transverse back-and-forth movement is imparted to the work-holder from the bell-crank lever. The arm L is connected to a longitudinally-guided slide, $a$, (see Fig. 1,) and so that the vibratory movement of the lever imparts a reciprocating movement to the slide $a$. This slide extends rearward, and at its rear end is an inward extension, $b$, in a horizontal plane, and through this extension $b$ is a vertical stud, $d$, (see Fig. 13,) which is adjustable in a longitudinal slot in the extension $b$, and is made so adjustable by an adjusting-screw, $e$, the adjusting-screw being fixed in the extension $b$ as to movement in an axial direction, but free to revolve. The screw works through the head of the stud $d$, and so that by turning the screw the stud will be moved backward or forward, according to the direction in which the screw is turned. The stud $d$ carries a dog, $f$, which extends to the rear, as seen in Fig. 2, and so as to swing freely in a horizontal plane. The free end of the dog terminates in two arms, $g$ $h$. The said dog being hung to the stud $d$, and that stud movable with the slide $a$, it follows that the dog will partake of the reciprocating movement of the slide; but the dog is free to swing to the right or left in a horizontal plane, as indicated by broken lines in Fig. 3.

On the base A, and beneath the dog $f$, the shifter $i$ is hung upon a pivot, $l$, (see Fig. 11,) and so as to swing thereon in a plane parallel with the dog above it.

The ends of the arms $g$ $h$ of the dog $f$ turn down—one on the right-hand side and the other on the left-hand side of the shifter $i$—and so that as the dog swings upon its pivot the shifter below stands in the path of the downward projections from the arms of the dog. The shifter $i$ is constructed with a shoulder, $m$, upon one side of its pivot, and with a like shoulder, $n$, upon the opposite side of its pivot. (See Fig. 11) The arms $g$ $h$ of the dog, through the downward projections therefrom, are adapted to respectively engage the said shoulders $m$ $n$, accordingly as they may be presented thereto. These shoulders $m$ $n$ are substantially opposite each other. The rear or free end of the shifter is constructed with a finger, $o$, on the same side as the shoulder $m$, and which finger projects to the left, and upon the opposite side the shifter is constructed with a like finger, $r$, which projects to the right. As the dog is moved backward and forward, as before described, under reciprocating movement, the turned-down ends of the arms $g$ $h$ work between the respective shoulders and corresponding fingers of the shifter.

The operation of the dog and shifter is as follows: Suppose the shifter to be turned to the left, as indicated in Fig. 11, and the dog to be thrown back to the position seen in Fig. 3. In this backward movement of the dog the downward projection from the arm $g$ will strike the finger $o$ of the shifter which stands in its path, and the said finger will act as a cam to turn the dog to the position seen in Fig. 3; and under this movement of the dog the downward projection from the opposite arm will be brought into line with the shoulder $n$ on the shifter, as seen in Fig. 3, and so that when the dog next advances the arm $h$ will engage the shoulder $n$ of the shifter, and as the dog completes its advance it will turn the shifter to the opposite side, as indicated in broken lines, Fig. 11. Then when the dog next retreats the finger $r$ of the shifter will stand in the path of the downward projection of the arm $h$, and that finger will now act as a cam upon the dog to return the dog, and so as to bring the arm $g$ into line with the other shoulder, $n$, of the shifter, and then on the next advance of the dog the arm $g$ will engage the shoulder $m$ and return the shifter to the first position, and so continuing, one advance of the dog will turn the shifter to one side and the next advance of the dog will return the shifter to the opposite side.

As the advance and retreat of the slide $a$ is constant, the action of the dog upon the shifter would be the same were it rigidly fixed to the slide $a$; but because of the adjustable stud $d$, which carries the dog, it follows that the dog may be thrown farther to the rear, or forward, as the case may be, by simply turning the set-screw $e$ accordingly. If, therefore, a greater extent of vibration is desired to be given to the shifter $i$, then the dog will be moved forward so that it will engage the shoulders $m$ $n$ on the shifter earlier in its advance or forward movement; or if the vibratory movement of the shifter is required to be less, then the dog is moved rearward, so that said engagement between the shoulders $m$ $n$ will be made later in the advance movement of the slide $a$. Thus the extent of vibration of the shifter may be readily adjusted.

From the shifter is a downwardly-projecting stud, $s$, (see Fig. 13,) which extends through a longitudinal slot, $x$, Fig. 4, in the plate O. This slot comes in rear of the pivot V, upon which the plate O or holder is hung. The slot permits longitudinal movement of the holder on the stud $s$, as will be hereinafter described. The vibratory movement of the shifter through the stud $s$ imparts a corresponding vibratory movement to the holder, as indicated by broken lines, Fig. 4, throwing it first to one side and then to the opposite side, and the work being held at the holder will be correspondingly moved to the right and left of the path of the needle, and when properly adjusted the needle will first descend in the line of the opening of the button-hole, and then in the next stitch will take onto the work at one side of the hole, and so continuing, the stitches being alternately made first in the line of the button-hole and then in the material at one side, and as in other button-hole attachments.

The feed to advance the work between successive stitches is produced by the lever I, before referred to. This lever I swings in a plane parallel with the actuating-lever J. One of its arms, $t$, extends rearward and the other arm, $u$, extends forward of the hub or fulcrum upon which it is hung. On the arm $t$ is a projecting stud, $w$, (see Fig. 1,) which stands in the path of a rear finger, 2, of the actuating-lever J, and so that as the arm J is raised it will turn the arm 2 downward and bring it into contact with the stud $w$, so that as the lever J completes its upward movement it will impart a downward movement to the arm $t$ of the lever I.

To the arm $t$ a lever, 3, is hung, extending upward and so as to swing in a plane parallel therewith. This lever 3 carries a projection, 4, above the finger 2, and so that as the lever J approaches its extreme downward position the arm 2 will strike the projection or shoulder 4 and raise the lever 3, together with the arm $t$, to which it is connected. Thus at each vibration of the lever J there will be a corresponding up-and-down movement imparted to the arm $t$. The lever I, with its arms $t$ $u$, forms the feeding-lever. The arm $u$ extends beyond the periphery of the disk G, which constitutes the feed-disk, and it is provided with a friction-dog to engage the periphery of the disk G. As here represented, this dog consists of a roller, 5, arranged in a recess in the end of the arm $u$, (see Fig. 10,) this recess being less in width at its lower end than the diameter of the roller, but larger above, and so that as the arm $u$ rises the roller will act as a dog between the arm $u$ and the disk to engage the disk, that it may receive an extent of rotation according to the upward movement of the arm $u$. Then when the arm $u$ descends the roller 5 escapes to the upper part of the recess, so that the return movement will not affect the feed-disk G. A spring, 6, is arranged above the roller sufficient to normally hold it in the lower or narrower part of the recess, but yet permit it to pass upward on the return of the arm $u$. A stop-dog is provided to prevent the possible return of the disk G after its advance movement under the action of the roller 5, and this stop-dog is best made by a roller, 7, working upon an incline, 8, and so as to impinge upon the periphery of the feeding-disk G, it passing up the incline as the disk advances, and then engaging between the incline and the disk, should there be any tendency in the disk to return. Thus, under each vibratory movement of the lever J, one rotative step will be imparted to the feed-disk G, and this step-by-step movement will continue throughout a full revolution. It will be understood that a full revolution of the feed-disk completes a button-hole.

As before stated, the disk G forms substantially a part of the disk E, so that the disk E must partake of the intermittent or step-by-step rotative movement of the disk G. To communicate this step-by-step movement to the work-holder a slide, 9, is arranged in longitudinal guides 10, parallel with the face of the disk E. In the side of the disk E is a crank-pin, 11, which works in a vertical slot, 12, in the slide 9, and so that in each full revolution of the disk E a full reciprocating movement will be imparted to the slide 9, according to the throw of the crank 11. This crank-pin is made adjustable in a radial slot, 13, in the disk E, in the usual manner for making adjustable crank-pins. From the slide 9 a stud, 14, extends down through a longitudinal slot, 15, in the base, as seen in Fig. 8, and so as to work into a corresponding transverse slot in the plate O, as seen in Fig. 2, and so that the step-by-step movement of the slide 9 will be imparted to the work-holder throughout the full revolution of the disk E, and such full revolution of the disk E will impart a full reciprocating movement to the holder—that is, advance for one side of the button-hole during one half the revolution of the disk E, and retreat for the other side of the button-hole during the other half of the revolution of the disk E.

As the action of the disk E upon the slide 9 is that of a crank, it necessarily follows that unless some provision be made to the contrary the extent of movement of the slide would increase as the crank passes from one dead-center to a point midway between the two dead-centers, and then diminish to the opposite dead-center, the result of which would be to begin at one end of a button-hole with short stitches, gradually increasing until midway of the length of the button-hole, and then diminishing toward the opposite end. It is true the variation would be slight; but to overcome such irregularity in the feed I make the disk E of cam shape, as seen in Fig. 2—that is to say, it is elongated in both directions in a diametrical line through the crank-pin, its shorter diameter being at right angles to said diametrical line, as seen in Fig. 2, and against this cam-shaped periphery of the disk E the free end of a lever, 17, bears, the lever hung upon a fulcrum, 18, and so as to swing in a plane parallel with the plane of the disk E, and so that as the disk revolves the free end of the lever will follow the shape of the periphery of the disk. The spring 19 bears the lever against the cam, so that while the cam will turn the lever in one direction the spring will cause it to return and follow the periphery of the disk. From the lever 17 an arm, 20, extends into a slot, 21, in the lever 3, which is hung to the arm t of the feed-lever, and so that the back-and-forth movement imparted to the lever 17 by the cam-disk E will be communicated to the lever 3 and cause it to move toward or from the feed-disk G.

The shoulder 4, against which the finger 2 of the actuating-lever operates, as before described, is fixed to the lever 3, and so that as the lever 3 is turned, under the action of the cam-disk E, and as indicated in Fig. 2, the shoulder 4 will recede from or advance toward the fulcrum on which the actuating-lever is hung; hence as the lever 3 is turned backward or away from the feeding-disk it moves away from the fulcrum of the actuating-lever, and consequently the same movement of the actuating-lever will impart a correspondingly increased upward movement to the lever 3, and consequently a greater movement to the feed-lever, and this increased or decreased movement of the feed depends upon the position which the shoulder 4 occupies with relation to the fulcrum of the actuating-lever.

The cam-disk E being elongated in the direction of the dead-centers of the crank and with relation to the lever 17, it follows that, starting from one dead-center, as indicated in broken lines, Fig. 2, the shoulder 4 will be thrown to its greatest distance from the fulcrum of the actuating-lever; hence at that point the extent of feed will be greatest, and that extent of feed will gradually diminish as the cam-disk arrives at the quarter-point and the shoulder 4 approaches the fulcrum, as seen in Fig. 2. Then from that point until the opposite dead-center is reached the shoulder 4 will recede from the fulcrum and the feed increase, and this decrease from one dead-center to the quarter-point and increase from that quarter-point to the opposite dead-center compensates for the variation before described, which would occur were the extent of feed constant throughout.

One side of the button-hole having been stitched and the end reached, to work across or around the end, the feed is substantially transverse or in a short semicircle. The operation of passing the end throws the work into a position that the needle may return upon the opposite side of the button-hole. To impart this transverse movement to the work-holder, a cam, 22, is formed upon the hub F of the disk E, or made as a part of the disk, as indicated in Fig. 12, this cam being clearly seen in Fig. 9; and guided on the base is a slide, 23, having two arms, 24 25, extending upward—one each side of the cam 22, and so that the cam works between the two arms as a fork; hence as the cam revolves with the feed and crank disks it will impart a reciprocating movement to the slide 23. This cam is in four divisions, as seen in Fig. 9. From 26 to 27 represents one side of the button-hole, and is the greatest projection of the cam concentric with its axis. From 27 to 28 the cam gradually contracts, and this contracted portion occurs at one end of the button-hole. From 28 to 29 is concentric with the axis, and is of the smallest diameter and of substantially the same extent as from 26 to 27, corresponding to the other side of the button-hole. Then from 29 to 26 is a rise in the cam like the fall off from 27 to 28, and corresponds to the opposite end of the button-hole.

On the base A, beneath the slide 23, a bell-crank lever is hung upon a fulcrum, 30. One arm, 31, extends longitudinally beneath the slide 23. The other arm, 32, extends outward at right angles, and from the slide an arm, 33, extends outward over the arm 32. The arms 32 and 33 are engaged by an adjustable screw-pivot, 34, working in slots in the respective arms, and so that the reciprocating movement of the slide 23, imparted by the cam 22, as before described, will impart a corresponding transverse vibratory movement to the arm 31, as indicated by broken lines, Fig. 11. From the arm 31 the stud V extends downward through the longitudinal slot W in the plate O of the work-holder, and so that the transverse movement of the arm 31 will be imparted to the work-holder, to throw it from right to left and return, as indicated in Fig. 4. Upon the lower end of the stud V a collar, 34, is fixed as a support for the plate O, and this collar stands in a corresponding slot in the hinged plate P of the work-holder, but so as to leave that plate free to swing up and down, as before described.

As the work approaches one end of the button-hole under the step-by-step rotative movement of the feed-disk, the cam 22, moving accordingly, brings one of its extreme points—say 27—to one arm of the slide and the opposite point, 29, to the other slide. Then the slide commences its reciprocating movement under the corresponding rise and fall of the cam until the opposite points, 28 and 26, are reached, and during the movement of the slide 23 under the rise and fall of the cam the lever 31 is turned to one side, and correspondingly throws the work-holder. Then, as the rise and fall of the cam 22 again come upon the slide, it will step by step throw it to the opposite extreme, and correspondingly turn the work-holder and present the button-hole for the opposite side, the stitching being made around the end during the step-by-step movement over the rise and fall of the cam, and this same movement will occur at each end of the button-hole.

As a full revolution of the feed-disk and crank-disk is required in stitching both sides and both ends of a single button-hole, irrespective of its length, it follows that an adjustment will be necessary to adapt the attachment to button-holes of different lengths. For illustration, suppose a button-hole to require one hundred stitches each side; then there will be required two hundred steps in the revolution of the feed-disk and crank. Now, if the button-hole be but half this length, then but fifty stitches will be required each side, and consequently one hundred steps in the full revolution of the feed-disk and crank-disk.

To adjust the feed so as to adapt it to button-holes of different lengths, the shoulder 4 is formed as a projection from a lever, 35, hung upon a fulcrum, 36, on the lever 3, and so that the lever, turned up or down, as the case may be, will correspondingly take the shoulder 4 farther from or bring it nearer to the finger 2, and consequently make the action of the finger 2 upon that shoulder sooner or later, accordingly as the shoulder is nearer to or farther from the finger, and this adjustment will increase or decrease the length of the step fed, the length of the button-hole being varied by adjusting the crank-pin 11.

That the operator may readily understand to what extent to adjust the crank-pin and the shoulder 4, a scale is provided on the face of the crank-disk at one side of the slot 13 therein, and the pointer 37 extends from the crank-pin onto that scale. That scale is graduated, say, to fractions of an inch. The lever 35 is also provided with a pointer, 38, which travels upon the lever 3, adjacent to a scale, as seen in Figs. 2 and 10, and this scale is graduated to make the stitches correspond to the length of the button-hole, and is for convenience figured corresponding to the scale on the crank-disk, as shown, so that when the crank-pin is set at one point the lever 35 will be set to a corresponding point on the lever 3. Then the number of stitches will correspond to the length of the button-hole to be made.

As the plate P is made universally adjustable, and in work of varying thicknesses is liable to tip to the right or left to adapt itself to such varying thickness of the work, it is desirable to give it a transverse support in any position to which it may adjust itself. To this end I provide the throat-plate 40 with a rocker, 41. (See Fig. 14.) This rocker is a narrow piece of metal arranged transversely across the throat-plate, and so as to stand at substantially right angles beneath the plate P. The needle-opening 42 is surrounded by a short tube, 43, to extend up through the slot in the plate P. The rocker has an opening through it, so as to set over the tube 43, and is hung upon a pintle, 44, in a line diametrically across the needle-opening, (the pintle, however, not extending across the opening,) and as seen in Fig. 16, and so that it may rock transversely, as indicated in broken lines, Fig. 15, and adapt itself to the varying transverse inclinations of the plate P. The hinge, while permitting the transverse rocking movement, prevents the rocker from rotating, and because of its being thus hinged it may be made very narrow, and consequently offers very slight resistance or friction in the movement of the work-holder, very much less than in the usual rotative disk.

The automatic adjustment of the feed with relation to the crank which I have described, whereby a uniformity of feed is maintained under a crank reciprocating movement, may be employed in other sewing-machine attachments; so, also, may the work-holder which I have described be employed in connection with other button-hole attachments. I therefore do not wish to be understood as limiting all the parts of my invention to the specific combination of elements shown and described.

I claim—

1. In a button-hole attachment for sewing-machines, the work-holder consisting of the plate O, the plate P, hung by its rear end to a socket on the plate O, whereby the said plate P will be permitted a universal self-adjustment with relation to the plate O, the forward end of the two plates constructed with an opening through which the needle may work in stitching the button-hole, substantially as described.

2. In a button-hole attachment for sewing-machines, the combination of a work-holder, a crank-disk with intermediate connection between said crank and work-holder and whereby said crank will impart reciprocating movement to said work-holder, a feed-disk concentric with said crank-disk, a feed-lever vibrating in a plane parallel with the plane of the feed-disk, a dog on said lever adapted to engage the periphery of said feed-disk, an actuating-lever, one arm adapted to connect with the needle-bar of the sewing-machine, the said feed-lever carrying a stud, $w$, a lever, 3, hung to said feed-lever and carrying a second shoulder or stud, 4, a portion of the actuating-lever adapted to work between the said two studs, the said lever 3 movable upon the feed-lever toward and from the feed-disk, a cam concentric with the feed and crank disks, the extreme throws of which are in a diametrical line through the crank and the minimum throws at right angles thereto, the said cam adapted to turn said lever 3 and the shoulder it carries toward and from the feed-disk, substantially as and for the purpose described.

3. In a button-hole attachment for sewing-machines, the combination of a work-holder, a crank-wheel, the connections between it and the work-holder, whereby reciprocating movement is imparted to said work-holder, a feed-disk concentric with said crank-disk, an actuating-lever adapted to connect with the needle-bar of a sewing-machine, mechanism, substantially such as described, between said actuating-lever and the feed-disk, whereby step-by-step rotation is imparted to said feed-disk and crank-disk, a cam, 22, a longitudinal slide, 23, in engagement with said cam and whereby said slide receives a longitudinal reciprocating movement, a bell-crank lever hung upon the base, so as to swing in a horizontal plane, one arm in connection with said slide and the other in connection with the work-holder, substantially as and for the purpose described.

4. In a button-hole attachment for sewing-machines, the combination of a work-holder, a crank-disk, connection between said crank-disk and work-holder, whereby said crank will impart reciprocating movement to said work-holder, an actuating-lever adapted to connect with the needle-bar of the sewing-machine, mechanism, substantially such as described, between said actuating-lever and feed-disk, whereby a step-by-step rotation is imparted to said crank-disk, a longitudinal slide, $a$, in connection with the actuating-lever and whereby longitudinal reciprocating movement is imparted to said slide, a shifter, $i$, hung upon a pivot in the base, so as to vibrate in a horizontal plane, constructed with shoulders $m\ n$, respectively, upon opposite sides of the pivot, and with corresponding fingers, $o\ r$, in rear of said shoulders, a horizontally-swinging dog, $f$, hung upon said slide $a$, the dog constructed with arms $g\ h$, adapted to respectively engage the shoulders $m\ n$ and fingers $o\ r$, the said dog made adjustable on said slide, substantially as described.

5. In that class of button-hole attachments for sewing-machines in which a work-holder is employed to carry the work, the combination therewith of a transverse rocker, 41, hung upon the throat-plate at the needle-hole and supported against rotation, substantially as described.

ALBERT W. JOHNSON.

Witnesses:
JOHN E. EARLE,
FRED C. EARLE.